US010327093B2

(12) United States Patent
Gibson et al.

(10) Patent No.: US 10,327,093 B2
(45) Date of Patent: Jun. 18, 2019

(54) LOCALIZATION FROM ACCESS POINT AND MOBILE DEVICE

(71) Applicant: ENT. SERVICES DEVELOPMENT CORPORATION LP, Houston, TX (US)

(72) Inventors: Jonathan D. Gibson, Austin, TX (US); Joseph Miller, Herndon, VA (US); Clifford A. Wilke, Herndon, VA (US); Scott A. Gaydos, Emmaus, PA (US); Harold S. Merkel, Houston, TX (US)

(73) Assignee: ENT. SERVICES DEVELOPMENT CORPORATION LP, Houston, TX (US)

( * ) Notice: Subject to any disclaimer, the term of this patent is extended or adjusted under 35 U.S.C. 154(b) by 0 days.

(21) Appl. No.: 15/306,025

(22) PCT Filed: Jul. 31, 2014

(86) PCT No.: PCT/US2014/049119
§ 371 (c)(1),
(2) Date: Oct. 21, 2016

(87) PCT Pub. No.: WO2016/018358
PCT Pub. Date: Feb. 4, 2016

(65) Prior Publication Data
US 2018/0146325 A1    May 24, 2018

(51) Int. Cl.
*H04W 4/00*        (2018.01)
*H04W 4/02*        (2018.01)
(Continued)

(52) U.S. Cl.
CPC ......... *H04W 4/02* (2013.01); *H04W 28/0226* (2013.01); *H04W 64/003* (2013.01); *H04W 4/20* (2013.01)

(58) Field of Classification Search
CPC ..... H04W 4/02; H04W 4/20; H04W 28/0226; H04W 64/003
See application file for complete search history.

(56) References Cited

U.S. PATENT DOCUMENTS 8,284,100 B2    10/2012 Vartanian et al.
8,521,680 B2     8/2013 Lin
(Continued)

FOREIGN PATENT DOCUMENTS

KR         20070001435         1/2007
KR     10-2009-0028997 A       3/2009
(Continued)

OTHER PUBLICATIONS

Afyouni, et al., "Spatial Models for Context-aware Indoor Navigation Systems: a Survey", Journal of Spatial Information Science, No. 4, May 25, 2012, pp. 85-123.
(Continued)

*Primary Examiner* — Khai M Nguyen
(74) *Attorney, Agent, or Firm* — Sheppard Mullin Richter & Hampton LLP

(57) ABSTRACT

Localization from an access point and mobile device can include receiving information from a mobile device and initiating a location package based on information received from the mobile device to select a location server. Localization information can be requested information from the location server, where the localization information includes localization information from at least one access point and information received from the mobile device. Based on the localization information from the location server and information from the mobile device, at least one of a plurality of packages to be initiated can be determined.

14 Claims, 4 Drawing Sheets

(51) Int. Cl.
*H04W 28/02* (2009.01)
*H04W 64/00* (2009.01)
*H04W 4/20* (2018.01)

(56) References Cited

U.S. PATENT DOCUMENTS

| | | |
|---|---|---|
| 8,606,295 B2 | 12/2013 | Jang et al. |
| 8,631,420 B2 | 1/2014 | Han et al. |
| 2008/0161011 A1* | 7/2008 | Babin ................ H04W 64/00 455/456.1 |
| 2012/0139781 A1* | 6/2012 | Jeong ................... G01S 5/021 342/357.23 |
| 2012/0324434 A1 | 12/2012 | Tewari et al. |
| 2013/0023284 A1* | 1/2013 | Stanger .............. G06Q 30/0259 455/456.1 |
| 2013/0311080 A1 | 11/2013 | Wirola et al. |
| 2013/0325616 A1 | 12/2013 | Ramde et al. |
| 2014/0162683 A1 | 6/2014 | Rochberger et al. |
| 2015/0006499 A1* | 1/2015 | Stewart ............. G06F 17/30864 707/706 |
| 2015/0230051 A1* | 8/2015 | Das ...................... H04W 4/029 455/456.1 |
| 2016/0021494 A1* | 1/2016 | Yang ...................... H04W 4/02 455/41.2 |
| 2018/0315090 A1* | 11/2018 | Greenberger ...... G06Q 30/0261 |

FOREIGN PATENT DOCUMENTS

| | | |
|---|---|---|
| KR | 10-1009638 B1 | 1/2011 |
| WO | WO-2012-086947 A2 | 6/2012 |
| WO | WO-2012073250 | 6/2012 |
| WO | WO-2012-138182 A2 | 10/2012 |

OTHER PUBLICATIONS

Gibson, et al. Making My Life Easier Through Context-Awareness, pp. 369-386, 2006.
PCT Search Report/Written Opinion—Application No. PCT/US2014/04911 dated Apr. 28, 2015—12 pages.

* cited by examiner

… (1) …

LOCALIZATION FROM ACCESS POINT AND MOBILE DEVICE

CLAIM FOR PRIORITY

The present application is a national stage filing under 35 U.S.C. § 371 of PCT application number PCT/US2014/049119, having an international filing date of Jul. 31, 2014, the disclosure of which is hereby incorporated by reference in its entirety.

BACKGROUND

In many arenas, disparate tools can be used to achieve desired goals. Use of disparate tools often occurs due to changing desires and changing conditions.

DETAILED DESCRIPTION

Figure 1:
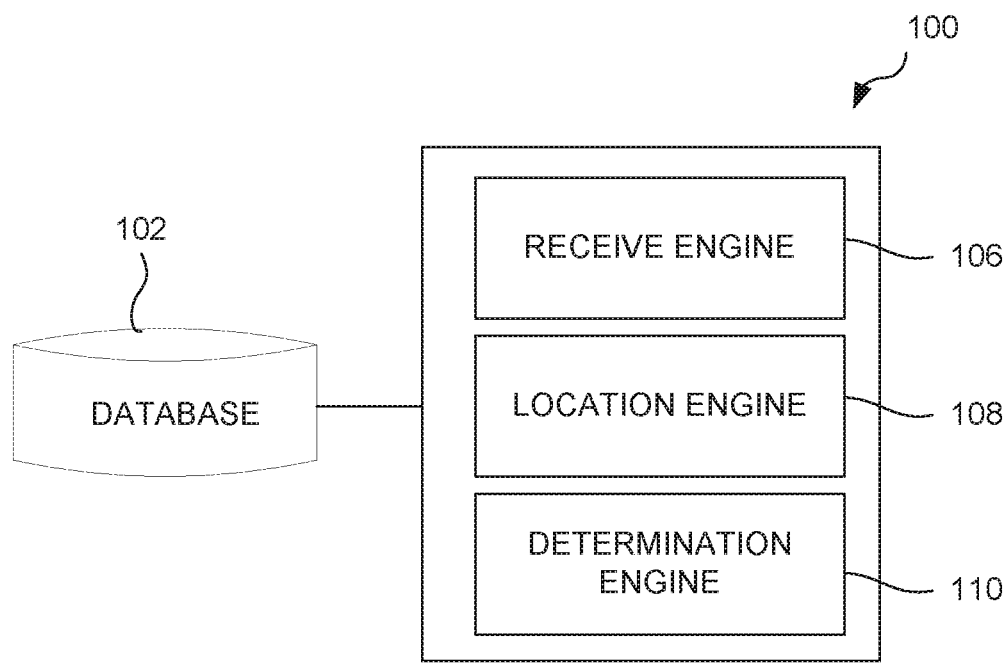
FIG. 1 illustrates a diagram of an example system according to the present disclosure.

As technology becomes increasingly prevalent, it can be helpful to leverage technology to integrate multiple devices, in real-time, in a seamless environment that brings context to information from varied sources without requiring explicit input. Various examples described below provide for context-aware platform (CAP) localization and remote management, which can allow for seamlessly providing contextual information to a user. That user can be a person, an organization, or a machine, such as a robot. For example, for an individual with a particular occupation, the example CAP can provide contextual information seamlessly through integration of a user's location, and other resources, as well as various services, such as turn-by-turn navigation and/or tracking. Some examples of the present disclosure can allow for a continual, seamless, integrated CAP localization and remote management experience. As used herein, "CAP experience" and "experience" are the interpretation of multiple elements of context in the right order and in real-time to provide information to a user in a seamless, integrated, and holistic fashion. In some examples, an experience or CAP experience can be provided by executing instructions on a processing resource.

The CAP experience is created through the interpretation of one or more packages. Packages can be atomic components that execute functions related to devices or integrations to other systems. As used herein, "package" means components (e.g., instructions executed by a processing resource) that capture individual elements of context in a given situation. In some examples, the execution of packages provides an experience. For example, a package could provide a schedule or a navigation component, and an experience could be provided by executing a schedule package to determine a user's schedule, and subsequently executing a navigation package to guide a user to the location of an event or task on the user's schedule.

In some examples, the platform can include one or more experiences, each of which correspond to a particular application, such as a user's occupation or a robot's purpose. In addition, the example platform can include a plurality of packages which are accessed by the various experiences. The packages can, in turn, access various information from a user or other resources, and can call various services, as described in greater detail below. As a result, the user can be provided with contextual information seamlessly with little or no input from the user. The CAP is an integrated ecosystem that can bring context to information automatically and "in the moment." For example, the CAP can sense, retrieve, and provide information from a plurality of disparate sensors, devices, and/or technologies, in context, and without input from a user.

The figures herein follow a numbering convention in which the first digit corresponds to the drawing figure number and the remaining digits identify an element or component in the drawing. For example, reference numeral 102 can refer to element "02" in FIG. 1 and an analogous element can be identified by reference numeral 202 in FIG. 2. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. Further, as used herein, "a number of" an element and/or feature can refer to one or more of such elements and/or features.

FIG. 1 illustrates a diagram of an example system according to the present disclosure. As shown in FIG. 1, the system 100 can include a database 102 accessible to and in communication with a plurality of engines. The engines can include a receive engine 106, a location engine 108, and a determination engine 110. The system 100 can include additional or fewer engines than illustrated to perform the various functions described herein and examples are not limited to the example shown in FIG. 1. The system 100 can include hardware, for example, in the form of transistor logic and/or application specific integrated circuitry (ASICs), firmware, and software, for example, in the form of machine readable and executable instructions (e.g., program instructions stored in a machine readable medium), which, in cooperation can form the computing device as discussed in connection with FIG. 2.

The plurality of engines can include a combination of hardware and software (e.g., program instructions), but at least include hardware configured to perform particular functions, tasks, and/or actions. For example, the engines shown in FIG. 1 can be used to communicate with a mobile device and provide localization information based on information received from the mobile device, information received from a location server and/or information received from an access point. In addition, the engines shown in FIG. 1 can determine a context of the localization information, determine at least one of a plurality of packages to execute based on the localization information and the context of the localization information, and execute at least one of the plurality of packages based on the determination of at least of the plurality of packages to execute.

In some examples, the receive engine 106 can include hardware and/or a combination of hardware and program instructions to communicate with a mobile device. For example, the receive engine 106 can receive localization information (e.g., via multilateration, global positioning system information, etc.) from the mobile device. In some examples, the receive engine 106 can request and receive localization information from a mobile device automatically (e.g., with no input from a user) and continuously (e.g., for the entire duration the mobile device is in range of the receive engine 106) as long a connection can be maintained between the receive engine 106 and the mobile device.

The location engine 108 can include a combination of hardware and program instructions to provide localization information based on information received from a mobile device and information received from an access point. For example, the location engine 108 can receive localization information regarding a mobile device from the receive engine 106. In some examples, the location engine 108 can receive information from an access point or plurality of access points. The location engine 108 can provide localization information based on the mobile device information received from the receive engine 106 and the information received from an access point.

The determination engine 110 can determine a context of the localization information. Further, in some examples, the determination engine 110 can determine at least one of a plurality of packages to execute based on the localization information, the context of the localization information, at least one of a plurality of user preferences, a device service rating, and a policy rating, and can execute at least one of the plurality of packages to, for example, provide a user with an experience. User preferences can include, for example, a service health rating, or a preferred service to use, etc. In addition, in some examples, the user preferences can be based on the localization information and can be used when a package to execute is determined. Examples are not so limited, however, and the user preferences can be based on previously saved states (e.g., preferences cached on a mobile device). In some examples, the user preferences can be a preference regarding a rating of the health of the service. In this regard, user preferences can be used to prioritize the order in which packages are executed. Similarly, a device service rating and/or a policy rating can be used to determine at least one of the plurality of packages to execute, as discussed at further length herein.

The examples of engines shown in FIG. 1 are not limiting, as one or more engines described can be combined or can be a sub-engine of another engine. Further, the engines shown can be remote from one another in a distributed computing environment, cloud computing environment, etc.

Figure 2:
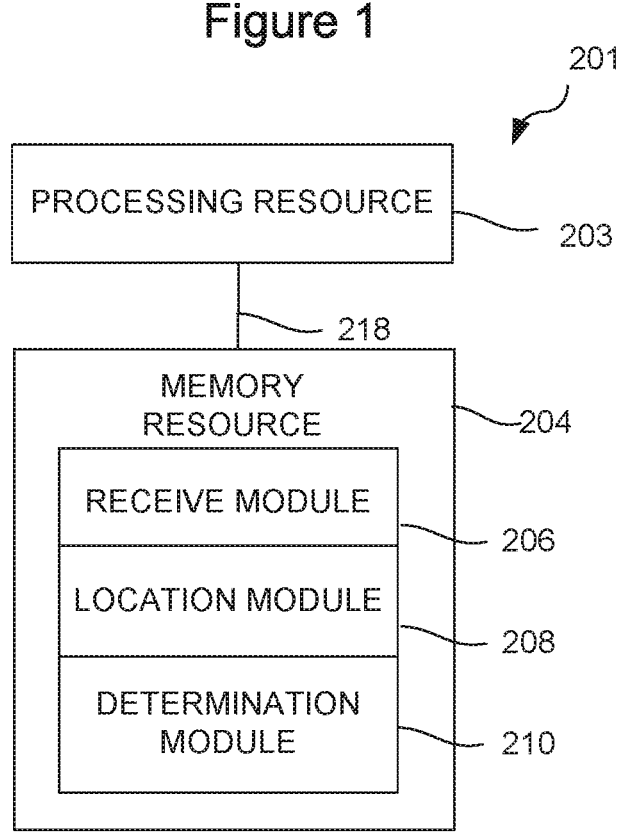
FIG. 2 illustrates a diagram of an example computing device according to the present disclosure.

FIG. 2 illustrates a diagram of an example computing device according to the present disclosure. The computing device 201 can utilize hardware, software (e.g., program instructions), firmware, and/or logic to perform a number of functions described herein. The computing device 201 can be any combination of hardware and program instructions configured to share information. The hardware can, for example, include a processing resource 203 and a memory resource 204 (e.g., computer or machine readable medium (CRM/MRM), database, etc.). A processing resource 203, as used herein, can include one or more processors capable of executing instructions stored by the memory resource 204. The processing resource 203 can be implemented in a single device or distributed across multiple devices. The program instructions (e.g., computer or machine readable instructions (CRI/MRI)) can include instructions stored on the memory resource 204 and executable by the processing resource 203 to perform a particular function, task and/or action (e.g., provide localization information based on information received from a mobile device and information received from an access point, etc.).

The memory resource 204 can be a non-transitory machine readable medium, can include one or more memory components capable of storing instructions that can be executed by a processing resource 203, and can be integrated in a single device or distributed across multiple devices. Further, memory resource 204 can be fully or partially integrated in the same device as processing resource 203 or it can be separate but accessible to that device and processing resource 203. Thus, it is noted that the computing device 201 can be implemented on a participant device, on a server device, on a collection of server devices, and/or a combination of a participant device (e.g., a mobile device, tablet, smart glass, etc.), and one or more server devices as part of a distributed computing environment, cloud computing environment, etc.

The memory resource 204 can be in communication with the processing resource 203 via a communication link 218 (e.g., a path). The communication link 218 can provide a wired and/or wireless connection between the processing resource 203 and the memory resource 204.

In the example of FIG. 2, the memory resource 204 includes a receive module 206, a location module 208, and a determination module 210. As used herein a module can include hardware and software (e.g., program instructions), but includes at least program instructions that can be executed by a processing resource, for example, processing resource 203, to perform a particular task, function and/or action. The plurality of modules can be combined or can be sub-modules of other modules. As shown in FIG. 2, the receive module 206, the location module 208, and the determination module 210 can be individual modules located on one memory resource 204. Embodiments are not so limited, however, and a plurality of modules can be located at separate and distinct memory resource locations, for example, in a distributed computing environment, cloud computing environment, etc.

Each of the plurality of modules can include instructions that when executed by the processing resource 203 can function as an engine such as the engines described in connection with FIG. 1. For example, the receive module 206 can include instructions that when executed by the processing resource 203 can function as the receive engine 106 shown in FIG. 1. The location module 208 can include instructions that when executed by the processing resource 203 can function as the location engine 108 shown in FIG. 1. Additionally, the determination module 210 can include instructions that when executed by the processing resource 203 can function as the determination engine 110 shown in FIG. 1.

The example computing device shown in FIG. 2 is not limiting, and in some cases a number of modules can operate together to function as a particular engine. Further, the engines and/or modules of FIGS. 1 and 2 can be located in a single system and/or computing device or reside in separate distinct locations in a distributed network, cloud computing, enterprise service environment (e.g., Software as a Service (SaaS) environment), etc.

Figure 3:
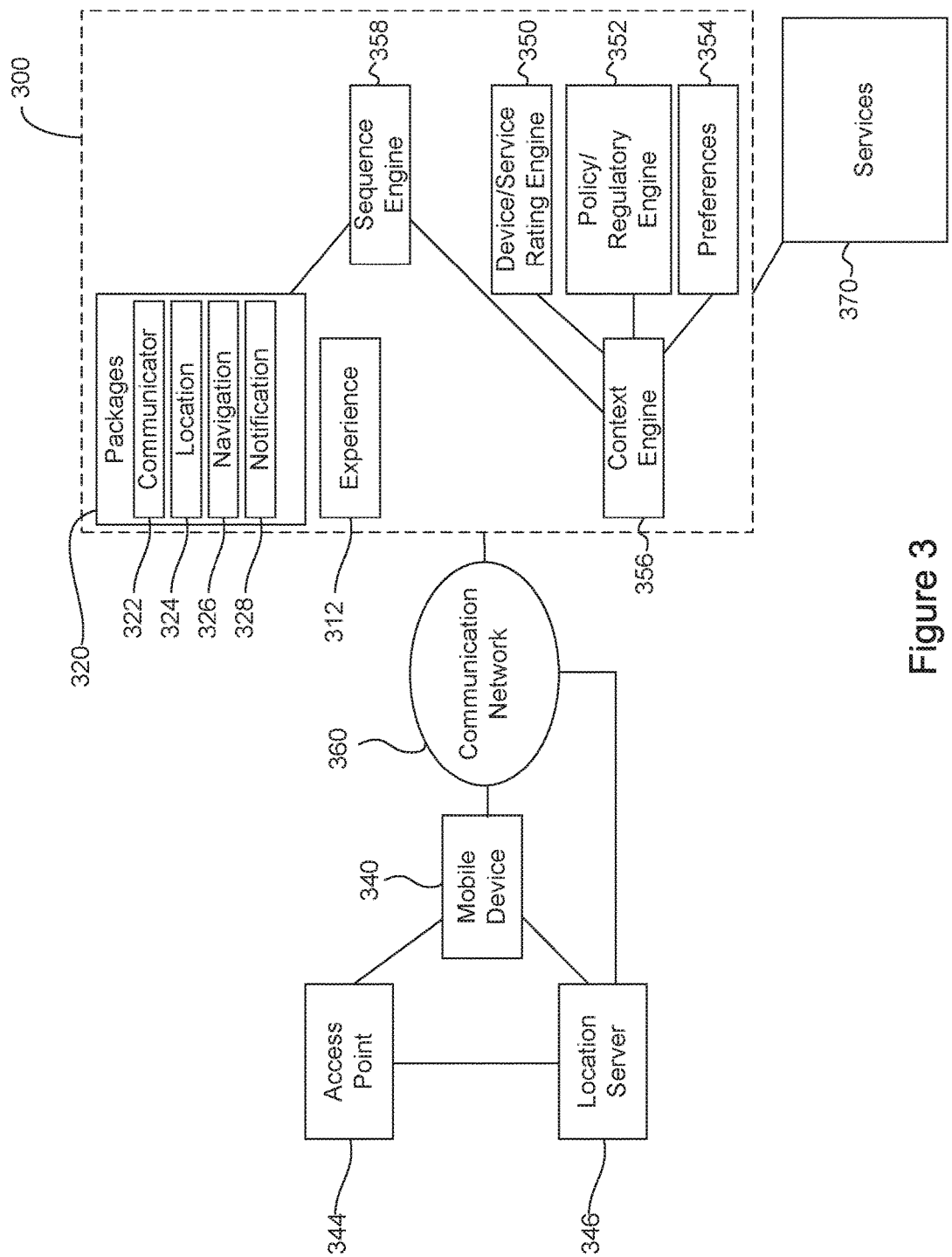
FIG. 3 illustrates a diagram of an example platform according to the present disclosure.

FIG. 3 illustrates a diagram of an example platform according to the present disclosure. In the example of FIG. 3, the context-aware platform (CAP) 300 can communicate with a mobile device 340 through a communication network 360. In addition, access point 344 and location server 346 can be in communication with the mobile device 340 and the CAP 300 via the communication network 360. In some examples, experience 312 and/or packages 320 can be in communication with the mobile device 340, access point 344, and/or location server 346 via a communication network 360. In addition to the mobile device 340, access point 344, location server 346, the experience 312 and/or packages 320 can also access other devices not shown in FIG. 3. For example, additional computers associated with a user can also be accessed.

Mobile device 340 can include a processor and memory configured to receive and communicate information. For example, a mobile device can include a computing device and/or wearable device, (e.g., smartphone, smart watch, electronic key fob, smart glass, and/or other devices and/or sensors that can be attached or worn by a user, etc.). In some examples, the mobile device 340 can be a single, integrated device; however, examples are not so limited and the mobile device 340 can include a plurality of devices in communication. In addition, the mobile device can be portable. For example, the mobile device 340 can include a smartphone, laptop, smart watch, smart glasses, and/or other devices and/or sensors that could be attached to a user (e.g., a human user, a machine, a robot, etc.) configured to be in communication with each other.

In the example of FIG. 3, the CAP 300 can determine what package to execute based on information provided by the context engine 356 and the sequence engine 358. In some examples, the context engine 356 can be provided with information from a device/service rating engine 350, a policy/regulatory engine 352, and/or preferences 354. For example, the context engine 356 can determine what package to execute based on a device/service rating engine 350 (e.g., hardware and/or program instructions that can provide a rating for devices and/or services based on whether or not a device can adequately perform the requested function), a policy/regulatory engine 352 (e.g., hardware and/or program instructions that can provide a rating based on policies and/or regulations), preferences 354 (e.g., preferences created by a user), or any combination thereof. In addition, the sequence engine 358 can communicate with the context engine 356 to identify packages 320 to execute, and to determine an order of execution for the packages 320. In some examples, the context engine 356 can obtain information from the device/service rating engine 350, the policy/regulatory engine 352, and/or preferences 354 automatically (e.g., without any input from a user) and can determine what package 320 to execute automatically (e.g., without any input from a user). In addition, the context engine 356 can determine what package 320 to execute based on the sequence engine 358.

In some examples, a location server 346 can be in communication with a mobile device 340, and can receive localization information from an access point 344. Access point 344 can be a standalone access point device; however, examples are not so limited, and access point 344 can be embedded in a device (e.g., a printer, point of sale device, etc.), and can be in communication with a processor and memory configured to communicate with the device it is embedded in. The location server 346 can determine a location of the mobile device 340 based on the localization information received from an access point 344 and information received from the mobile device 340. The location server can be a standalone device or it can be integrated into another device (e.g., a printer, point of sale device, etc.). In some examples, the location of the mobile device 340 can be sent to the CAP 300 via the communication network 360; however, examples are not so limited, and localization information can be provided to the mobile device 340 and/or stored at the location server 346 (e.g., for subsequent retrieval). In addition, the location server 346 can be configured to continuously determine the location of the mobile device 340. For example, the location server 346 can track the location of the mobile device 340 in real-time or near real-time. In this regard, the location server 346 and CAP 300 can be used to monitor access to, for example, a restricted area in a building, a section of a store, etc.

In some examples, the location server 346 can communicate localization information regarding a mobile device 340 to the CAP 300 via a communication network 360 without communicating localization information to the mobile device 340. For example, the location server 346 can determine localization information for a mobile device 340 based on information received from the mobile device 340 and access point 344 and forward the information to the CAP 300 through a communication network 360 so the CAP 300 can execute packages 320 to facilitate an experience 312. In this regard, an experience 312 can be provided to a user without explicit input from a user.

In various examples, CAP 300 can communicate with and/or access various services 370 to facilitate experience 312. For example, a service to provide context-based information to a mobile device (e.g., maps, coupons, context-based suggestions, etc.) can be provided to the CAP 300 via services 370.

Figure 4:
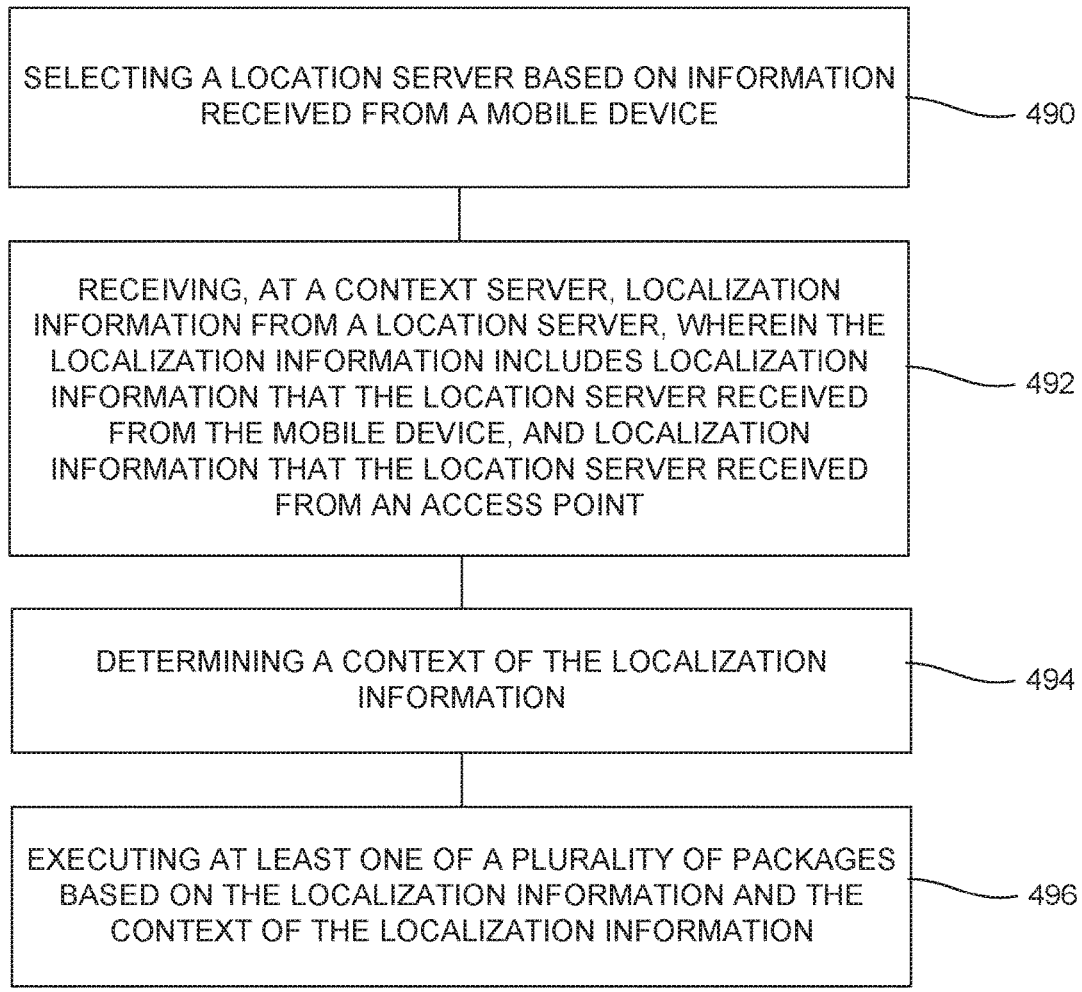
FIG. 4 illustrates a flow diagram of an example method according to the present disclosure.

FIG. 4 illustrates a flow diagram of an example method according to the present disclosure. In various examples, the method can be performed using the system 100 shown in FIG. 1 and/or the computing device and modules 201 shown in FIG. 2. Embodiments are not, however, limited to these example systems, devices, and/or modules.

The method can include selecting a location server based on information received from a mobile device, as shown at 490. For example, a mobile device (e.g., a smartphone) can communicate with a location server or plurality of location servers to identify a location server to select. In some examples, selection of the location server can be based on factors such as the proximity of the mobile device to the location server, the reliability of the location server, the availability (e.g., how much processing power is available to the location server) of the location server, etc. For example, the location server can be selected based on a signal strength of the location server received by a mobile device.

As shown at 492, the method can include receiving, at a context server, localization information from a location server, where the localization information includes localization information that the location server received from a mobile device and localization information that the location server received from an access point. For example, the context server (e.g., CAP 300 illustrated in FIG. 3) can receive localization information from a mobile device (e.g., 340 illustrated in FIG. 3) in response to the mobile device being sufficiently close to the location server that a wireless connection can be made. In some examples, the context server (e.g., CAP 300 illustrated in FIG. 3) can request localization information from an access point (e.g., 344 illustrated in FIG. 3) in response to receiving localization information from a mobile device (e.g., 340 illustrated in FIG. 3). In some examples, the location server can remain in constant communication with an access point, and can remain in communication with a mobile device so long as the mobile device is sufficiently close to the location server that a communication signal can be maintained between the mobile device and the location server.

As shown at 494, the method can include determining a context of the localization information. In some examples, the context of the localization information can be determined by a context engine (e.g., 356 illustrated in FIG. 3) based on a device/service rating engine (e.g., 350 illustrated in FIG. 3), a policy/regulatory engine (e.g., 352 illustrated in FIG. 3), and/or preferences (e.g., 354 illustrated in FIG. 3). Determination of the context of the localization information can be based on localization information regarding the mobile device (e.g., 340 illustrated in FIG. 3), a time of day or night, and/or other such contextual information.

The method can include executing at least one of a plurality of packages based on the localization information and the context of the localization information, as shown at 496. For example, a diagnostic package (e.g., a package to diagnose and/or troubleshoot a device) can be executed in response to a technician with a mobile device arriving at a printer and/or point of sale device to be serviced with an embedded access point, location server, and/or a coupon package (e.g., a package to send a notification to a mobile device including a coupon or special price) can be executed in response to a consumer with a mobile device getting close to an access point and/or location server embedded in a point of sale device. Embodiments are not so limited, however, and a plurality of packages can be executed based on context information regarding the device to provide an experience.

Figure 5:
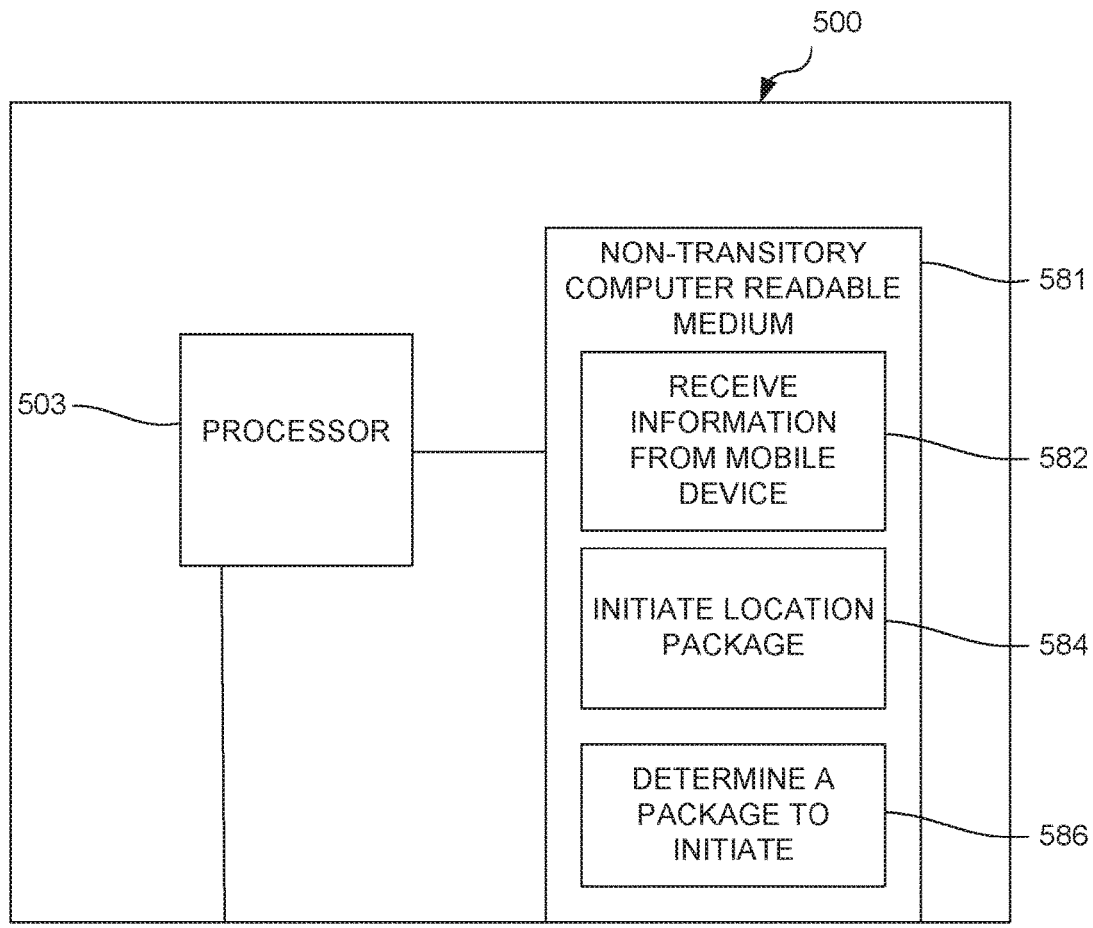
FIG. 5 illustrates a diagram of an example system including a processor and non-transitory computer readable medium storing executable instructions according to the present disclosure.

FIG. 5 illustrates a diagram of an example system 500 including a processor 503 and non-transitory computer readable medium 581 storing executable instructions according to the present disclosure. For example, the system 500 can be an implementation of the example system of FIG. 1.

The processor 503 can be configured to execute instructions stored on the non-transitory computer readable medium 581. For example, the non-transitory computer readable medium 581 can be any type of volatile or non-volatile memory or storage, such as random access memory (RAM), flash memory, read-only memory (ROM), storage volumes, a hard disk, or a combination thereof. When executed, the instructions can cause the processor 503 to perform a method of localization and remote management from an access point, location server, and mobile device, such as the method described with respect to FIG. 4. CAP remote management can be enabled through an existing printer and/or point of sale remote connectivity infrastructure to, for example, remotely manage and configure the CAP environment.

The example medium 581 can store instructions 582 executable by the processor 503 to receive information from a mobile device. For example, the processor 503 can execute instructions 582 to receive localization information regarding the mobile device. In some examples, the processor 503 can execute instruction 582 to perform block 490 of the method of FIG. 4.

The example medium 581 can further store instructions 584. The instructions 584 can be executable to initiate a location package based on information received from a mobile device to select a location server, and request localization information from the location server, where the localization information can include localization information from at least one access point and information received from the mobile device. In some examples, the access point can be embedded in a printer and/or point of sale device. In some examples, the location server can continuously receive information from the mobile device automatically (e.g., with no input from a user). In addition, in some examples, the localization information can be stored for later retrieval.

The example medium can further store instructions 586. The instructions 586 can be executable to determine, based on the localization information from the location server, access point, and information from the mobile device, at least one of a plurality of packages to be initiated. For example, a context of the localization information may be determined based on localization information from at least one access point and information received from a mobile device. In some examples, at least one of the plurality of packages can be initiated in response to the determination of at least one of the plurality of packages to be initiated. In some examples, the processor 503 can execute instructions 586 to perform block 496 of the method of FIG. 4.

In the foregoing detailed description of the present disclosure, reference is made to the accompanying drawings that form a part hereof, and in which is shown by way of illustration how examples of the disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the present disclosure.

As used herein, "logic" is an alternative or additional processing resource to perform a particular action and/or function, etc., described herein, which includes hardware, for example, various forms of transistor logic, application specific integrated circuits (ASICs), etc., as opposed to computer executable instructions, for example, software firmware, etc., stored in memory and executable by a processor.

What is claimed:

1. A non-transitory computer readable medium storing instructions executable by a processing resource to:
   receive information from a mobile device;
   initiate a location package, based on the information received from the mobile device, to:
     select a location server; and
     request localization information from the location server, wherein the localization information includes localization information from at least one access point and the information received from the mobile device;
   determine a context of the localization information based on localization information from the at least one access point and the information received from the mobile device; and
   determine, based on context of the localization information, the localization information from the location server and the information from the mobile device, at least one of a plurality of packages to be initiated.

2. The non-transitory medium of claim 1, wherein the instructions are further executable by the processing resource to cause the location server to continuously receive information from the device automatically.

3. The non-transitory medium of claim 1, wherein the instructions are further executable by the processing resource to store the localization information for later retrieval.

4. The non-transitory medium of claim 1, wherein the instructions are further executable by the processing resource to initiate the at least one of the plurality of packages in response to the determination of the at least one of the plurality of packages to be initiated.

5. The non-transitory medium of claim 1, wherein the access point is embedded in at least one of:
   a printer; and
   a point of sale device.

6. A method, comprising:
selecting a location server based on information received from a mobile device;
receiving, at a context server, localization information from the location server, wherein the localization information includes localization information that the location server received from the mobile device, and localization information that the location server received from an access point;
determining a context of the localization information; and
executing at least one of a plurality of packages based on the localization information and the context of the localization information.

7. The method of claim 6, wherein selecting a location server includes selecting the location server based on a signal strength of the location server received by the mobile device.

8. The method of claim 6, wherein the mobile device is a smartphone.

9. A system, comprising:
a receive engine to communicate with a mobile device;
a location engine to provide localization information based on information received from the mobile device, information received from a location server, and information received from an access point; and
a determination engine to:
determine a context of the localization information;
determine at least one of a plurality of packages to execute based on:
the localization information;
the context of the localization information;
at least one of a plurality of user preferences;
a device service rating; and
a policy rating; and
execute the at least one of the plurality of packages based on the determination of the at least one of the plurality of packages to execute.

10. The system of claim 9, wherein the mobile device is a wearable device.

11. The system of claim 9, wherein the access point or location server is embedded in a printer.

12. The system of claim 9, wherein the access point or location server is embedded in a point of sale device.

13. The system of claim 9, wherein the determination engine stores the localization information.

14. The system of claim 9, wherein the at least one of the plurality of packages is executed automatically with no input from the mobile device.

* * * * *